H. WHITT.
TRANSMISSION LOCK.
APPLICATION FILED MAR. 15, 1920.
1,352,489.
Patented Sept. 14, 1920.
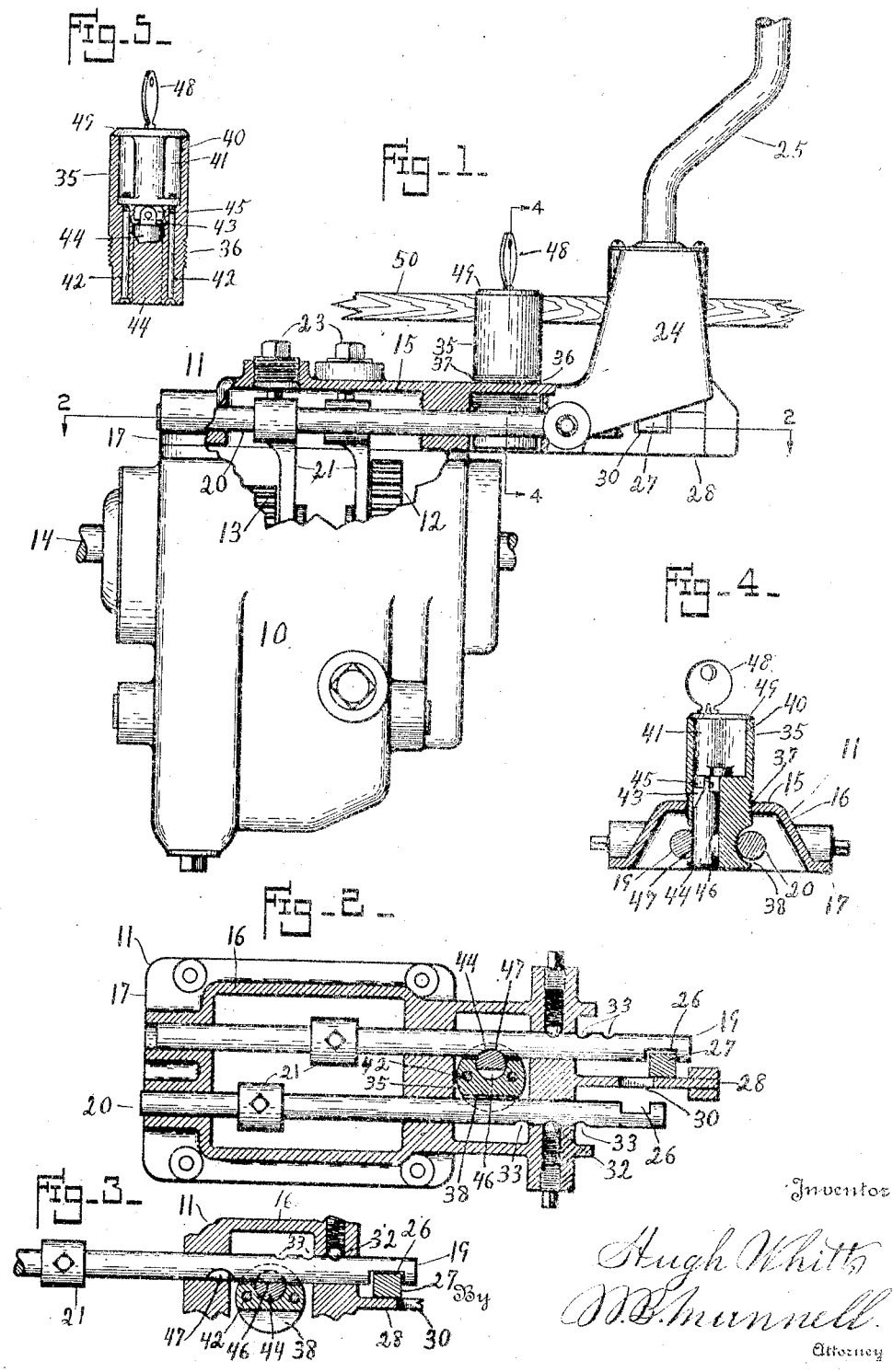

UNITED STATES PATENT OFFICE.

HUGH WHITT, OF LOUISVILLE, KENTUCKY.

TRANSMISSION-LOCK.

1,352,489.  Specification of Letters Patent.  Patented Sept. 14, 1920.

Application filed March 15, 1920. Serial No. 365,973.

*To all whom it may concern:*

Be it known that I, HUGH WHITT, a citizen of the United States, residing at Louisville, county of Jefferson, and State of Kentucky, have invented new and useful Improvements in Transmission-Locks, of which the following is a specification.

This invention relates to locks adapted to be used in connection with the transmission of an automotive vehicle to prevent unauthorized use or theft thereof.

Theft or unauthorized use of automobiles occurs so frequently as to be a cause of considerable uneasiness to owners of machines who have to park them, or leave them standing for any considerable time by a street curb.

Means have been devised for the purpose of preventing such unauthorized use, such as locking the ignition switch in open position, or locking the fuel supply valve in closed position. But thieves have circumvented such protective measures in some cases towing the car away without disturbing the protective device.

An object of this invention is to provide means whereby the transmission gears of the vehicle may be locked in an adjusted position preferably in what is termed "the reverse," in which condition the vehicle, under its own power can only move backward. And if an attempt is made to tow the car, the rear wheels will not turn, thereby attracting attention.

With the foregoing and other objects in view, the invention consists of the novel construction and arrangement of parts illustrated in the accompanying drawing, which forms a part of this specification, wherein is set forth an embodiment of the invention, but it is to be understood that such changes and modifications may be resorted to as come within the scope of the claim appended hereunto.

In the drawing wherein similar reference characters designate like parts in the several views, Figure 1, is a side elevation of the transmission of an automotive vehicle, parts being broken away to show the construction: Fig. 2, section on line 2—2 of Fig. 1, showing the parts in locked position: Fig. 3, a view similar to Fig. 2, showing a portion of the parts in unlocked position: Fig. 4, a section on line 4—4 of Fig. 1, and Fig. 5, a central vertical section at right angles to Fig. 4.

Referring now in detail to the drawing, the reference character —10— designates a transmission housing having a removable cover —11—. Within the housing are gears —12—13— slidably mounted on a shaft —14—. The cover comprises a top —15—, side walls —16—, and a lateral flange —17—. A pair of parallel bars —19, 20—, are slidably positioned in the cover, longitudinally thereof. Fingers —21— adjustably disposed on these rods depend therefrom into engagement with the shift gears. Openings in the top of the cover, closed by plugs —23— afford access to the fingers. On an extension of the cover, a dome —24— is erected. A tiltable hand lever —25— is supported intermediate its length in the upper end of the dome in such manner as to be movable backward, forward or sidewise. The sliding bars are provided on their opposed sides with recesses —26— for the reception of the lower end —27— of the lever. A median partition —28— is provided in its upper edge with a notch —30— which permits the lever to be tilted sidewise when it is in a position (vertical) wherein its lower end registers therewith. When the sliding bars are in a normal, or what is termed a neutral position the recesses 26, lie opposite the notch in the partition and the lever may be caused to engage with either thereof. When the lever is engaged with either bar it may be tilted to slide the bar either forward or backward, and cannot be disengaged therefrom until the bar is returned to the neutral position. It will be observed that but one bar can be engaged and moved at a time and that the operated bar must be returned to the neutral position before the lever can be shifted to engage with the other bar. The bars are held in adjusted positions by means of spring pressed balls —32— which engage in notches —33— in the outer sides of the bars. A cylindrical lock casing —35— is provided exteriorly with screw threads —36— whereby it may be secured in an opening —37— in the top of the cover through which it extends downward to the lower edge thereof. In order to insert the lock casing, the sliding bars must be withdrawn to do which, the plugs 23, are removed and the set screws holding the fingers are loosened. The lock casing is provided near its lower end on opposite sides, with grooves —38— which permit the bars to be returned to their proper position, where they effectively prevent removal of the casing. The lock casing is provided at its upper end with a chamber —40— for the reception of a cylinder block —41—, the escutcheon —49— of which rests upon the upper end of the casing and is held in place by means of screws —42— which extend upward from the bottom or lower end of the casing. An eccentrically positioned bore —43— leads downward from the chamber and houses a bolt —44— which is connected to and turns with the bolt —45— of the lock. The bolt 44 intersects the path of the bar 19, and is provided with a recess —46— to permit of its passage. The bar 19, is provided at a selected point with a recess —47— which when the bar is shifted, will be brought opposite the bolt 44, which may then be turned so as to engage therein and prevent further movement of the bar. The bolt 44, is turned by means of a key —48— inserted in the lock. It is obvious that when the bolt is turned so that it lies within the recess, in the bar, the bar cannot be moved. The recess can be located in either bar and at any point along its path of travel past the bolt.

The transmission is a portion of the power plant, and lies below the floor —50— of the vehicle, the dome extending up therethrough. The lock casing is so proportioned that the escutcheon of the lock will lie substantially flush with the surface of the floor. To install the lock, it is only necessary to bore a hole in the top of the cover of the transmission housing, at a suitable point forward of the dome, cut the threads therein, draw the bars forward, screw the casing in place and restore the bars.

Having thus described my invention so that those skilled in the art pertaining thereto can make and use the same.

I claim:

In combination with the transmission gear of an automobile, a pair of longitudinally movable gear shift rods having notches in their confronting faces, a partition between said rods having a slot therein intermediate its ends, a hand lever universally pivoted adjacent said partition and rods and having a portion movable through the slot to selectively engage one of the notches, a lock casing extending between said rods adjacent said partition and having oppositely disposed guide notches receiving said rods, said casing further having a perpendicular bore intersecting one of the guide notches, the rod passing through the intersected guide notch being provided with a notch adapted to register with the bore, a bolt fitting revolubly in the bore and being provided on one side with a notch adapted to register with the guide notch whereby to allow free movement of the rod, the side of the bolt opposite the notch therein being cylindrical to engage the notch in the rod, and a lock having operative connection with the bolt to rotate the same.

HUGH WHITT.